United States Patent
Kolluri et al.

(10) Patent No.: US 7,437,368 B1
(45) Date of Patent: Oct. 14, 2008

(54) METHOD AND SYSTEM FOR INTERACTIVE PRODUCT MERCHANDIZING

(75) Inventors: Venkateswarlu Kolluri, Shrewsbury, MA (US); Alden Dorosario, South Grafton, MA (US)

(73) Assignee: Chitika, Inc., Marlborough, MA (US)

( * ) Notice: Subject to any disclaimer, the term of this patent is extended or adjusted under 35 U.S.C. 154(b) by 348 days.

(21) Appl. No.: 11/216,962

(22) Filed: Aug. 31, 2005

Related U.S. Application Data

(60) Provisional application No. 60/696,286, filed on Jul. 5, 2005.

(51) Int. Cl.
G06F 7/00 (2006.01)
G06F 17/30 (2006.01)

(52) U.S. Cl. .............. 707/10; 707/1; 707/3; 705/14

(58) Field of Classification Search .............. None
See application file for complete search history.

(56) References Cited

U.S. PATENT DOCUMENTS

| | | | | |
|---|---|---|---|---|
| 6,029,195 | A * | 2/2000 | Herz | 725/116 |
| 6,332,127 | B1 * | 12/2001 | Bandera et al. | 705/14 |
| 7,117,173 | B1 * | 10/2006 | Ambani | 705/35 |
| 7,124,093 | B1 * | 10/2006 | Graham et al. | 705/14 |
| 2002/0046257 | A1 * | 4/2002 | Killmer | 709/218 |
| 2002/0082925 | A1 * | 6/2002 | Herwig | 705/16 |
| 2002/0103703 | A1 * | 8/2002 | Spetalnick | 705/14 |
| 2002/0123912 | A1 | 9/2002 | Subramanian et al. | |
| 2002/0174101 | A1 * | 11/2002 | Fernley et al. | 707/1 |
| 2002/0184203 | A1 * | 12/2002 | Nastar et al. | 707/3 |
| 2003/0037041 | A1 * | 2/2003 | Hertz | 707/1 |
| 2004/0133467 | A1 * | 7/2004 | Siler | 705/14 |
| 2004/0181525 | A1 | 9/2004 | Itzhak et al. | |
| 2005/0033641 | A1 * | 2/2005 | Jha et al. | 705/14 |
| 2005/0096980 | A1 * | 5/2005 | Koningstein | 705/14 |
| 2005/0154640 | A1 | 7/2005 | Kolluri et al. | |

\* cited by examiner

*Primary Examiner*—Tim Vo
*Assistant Examiner*—Jay A Morrison
(74) *Attorney, Agent, or Firm*—J. Scott Southworth

(57) ABSTRACT

A method and system for interactive product merchandising for an end user accessing a destination, such as a Web site, over a network, such as the Internet. The method includes extracting information pertaining to the destination and using this information to select a product to promote to the end user. Then heterogeneous information is collected that is related to the product, such as vendors, pricing, vendor ratings, vendor reviews, product ratings, product reviews, other related products, and other information. A unified display unit is composed from the heterogeneous information to provide an interactive user interface for the end user for presentation at the destination (e.g., displayed on the Web site). The method also tracks activity by the end user at the unified display unit to use as input in selecting one or more other products for another promotion to the end user. The method is aimed at encouraging impulsive buying by an end user who is browsing the network without intending to make a purchase. The unified display unit provides an opportunity for interaction by the end user to provide options and information that encourage the end user to complete a purchase.

6 Claims, 7 Drawing Sheets

METHOD AND SYSTEM FOR INTERACTIVE PRODUCT MERCHANDIZING

RELATED APPLICATION

This application claims the benefit of U.S. Provisional Patent Application No. 60/696,286, filed on Jul. 5, 2005, the entire teachings of which are incorporated herein by reference.

BACKGROUND

Internet Web sites often display advertising for users, who access a particular Web site. In one approach, such advertising is typically determined primarily by the entries made by a user in a search engine to find a specific Web site that the user is interested in. The advertising is displayed in a banner or box on the Web site, which can be a Web site for a search engine accessed by the user (that shows a list of Web sites along with the advertisement) or the Web site that the user was originally seeking (that shows the content of the Web site along with the advertisement).

SUMMARY OF THE INVENTION

In one aspect, the invention features a method for interactive product merchandising directed to an end-user engaging in information seeking activity to access a destination over a network. The method includes selecting a product to promote based on extracted information pertaining to the destination accessed by the end-user; collecting heterogeneous information related to the selected product; composing the heterogeneous information into a unified display unit for promotion of the selected product to the end-user at the destination; and tracking activity by the end-user interacting with the unified display unit for use as input in selecting one or more other products for another promotion.

In one embodiment, selecting the product to promote includes selecting the product to promote based on profile information related to the end-user context.

In another embodiment, the product includes one or more of a service, a recommendation, and a referral.

The unified display unit, in another embodiment, includes components related to the selected product including one or more of a description, a display of vendors, a display of prices, a product review, a vendor review, a product rating, a vendor review, and Web log information.

In one embodiment, the tracking activity by the end user includes tracking input by the end-user to the unified display unit.

In another embodiment, the information seeking activity is nonintentional browsing of the network and the promotion is directed to an impulse purchase by the end user.

In a further embodiment, selecting a product to promote comprises gathering evidence related to product selection based on a weighted processing of input votes. The input votes, in another embodiment, are based on keywords, topics, categories, and phrases. In another embodiment, the input votes include two or more of an editorial vote, a text analysis vote, a destination owner vote, and a visitor vote. The weighted processing of votes, in another embodiment, is based on weighted marker propagation across a conceptual network of weighted links.

In another aspect, the invention features a server for interactive product merchandising directed to an end-user engaging in information seeking activity to access a destination over a network. The server includes a product selector module to select a product to promote based on extracted information pertaining to the destination accessed by the end-user; a display composer module to collect heterogeneous information related to the selected product and to compose the heterogeneous information into a unified display unit for promotion of the selected product to the end-user at the destination; and an activity tracking module to track activity by the end-user interacting with the unified display unit for use as input in selecting one or more other products for another promotion.

In another aspect, the invention features a server for interactive product merchandising directed to an end-user engaging in information seeking activity to access a destination over a network. The server includes means for selecting a product to promote based on extracted information pertaining to the destination accessed by the end-user; means for collecting heterogeneous information related to the selected product; means for composing the heterogeneous information into a unified display unit for promotion of the selected product to the end user at the destination; and means for tracking activity by the end-user interacting with the unified display unit for use as input in selecting one or more other products for another promotion.

In another aspect, the invention features a computer program product embodied in a computer readable medium, having instructions for software for interactive product merchandising directed to an end-user engaging in information seeking activity to access a destination over a network, such that the instructions, when carried out by a processor of a computer, cause the computer to select a product to promote based on extracted information pertaining to the destination accessed by the end-user; to collect heterogeneous information related to the selected product; to compose the heterogeneous information into a unified display unit for promotion of the selected product to the end-user at the destination; and to track activity by the end-user interacting with the unified display unit for use as input in selecting one or more other products for another promotion.

In another embodiment, the computer program product is a computer program propagated signal product and the computer readable medium is a propagation medium transporting a propagated signal that embodies the computer program propagated signal product.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
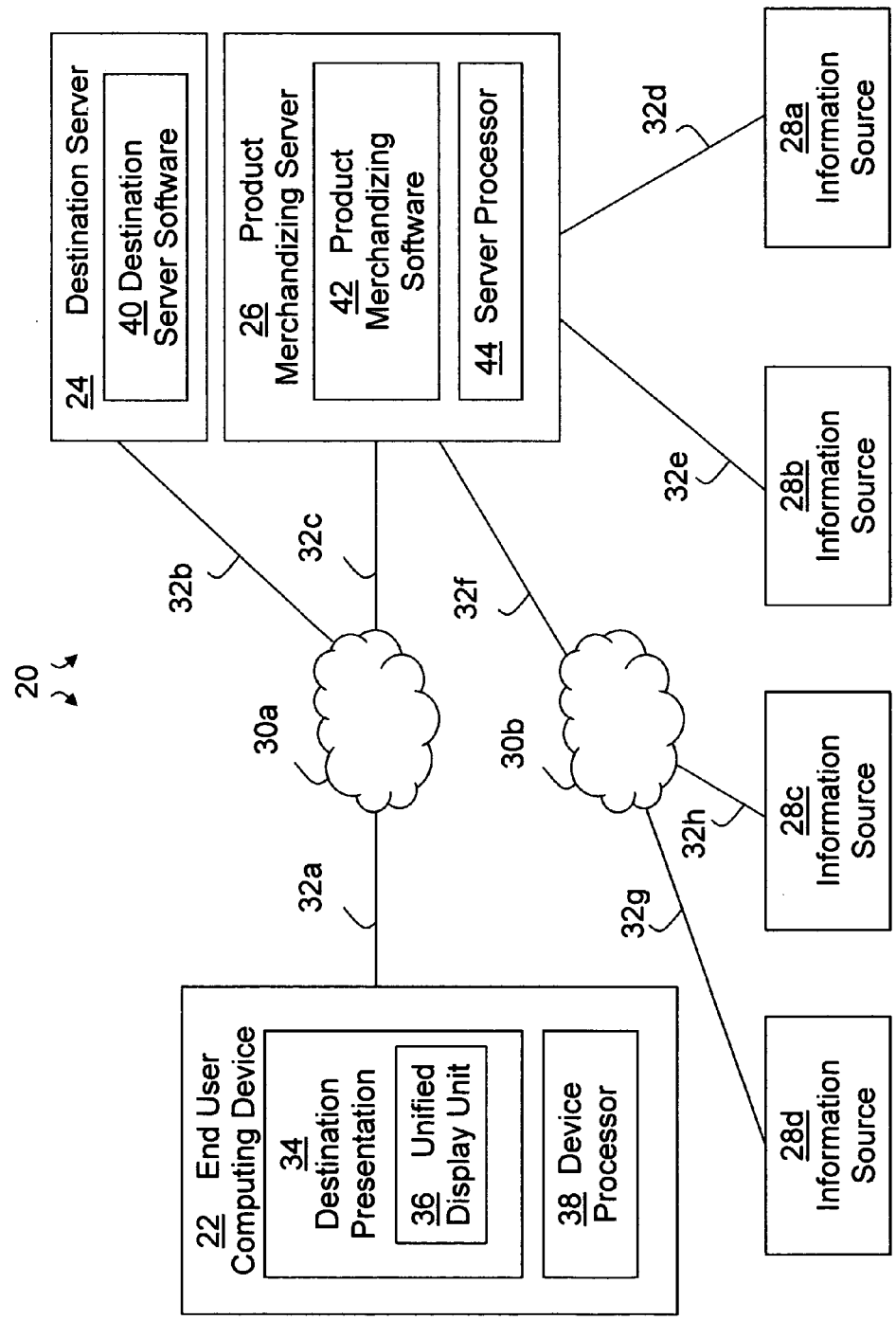
FIG. 1 is a schematic diagram of a networked environment for a product merchandising system, according to the principles of the invention.

In a conventional contextual advertising system, a user of the Web has an intent to locate a specific Web site or has in mind specific information that leads to the Web site. The user has a goal or intent in mind (e.g., take a trip, make a purchase, etc.) and engages in directed activity to reach a Web site specifically in support of this goal. For example, the user enters specific keywords in a search engine. The conventional contextual advertising system analyzes these keywords and infers the intent of the user. The advertising system then selects an appropriate advertisement, and displays the advertisement in a banner or box. In one example, the user uses a search engine to find a list of Web pages. An advertising system matches and displays appropriate ads for additional Web sites that the advertising system guesses are a match to the inferred intent of the user.

However, not all users engage in a directed, intentional search. Many users browse the Web, moving from one Web site to another, based on links or topics that interest them at the moment. That is, the activity is not an intentional search with a specific goal (e.g., specific product purchase), but a form of nondirected activity. Such activity may be compared to looking through a newspaper, without a specific topic in mind, but reading articles that capture one's attention. Conventional models for intentional marketing produces advertisements that are not typically effective for the nonintentional user of the Web, who typically desires more information (e.g., comparative product information, product reviews, vendor reviews, pricing, ratings, and other information) before making the purchase, because the purchase is not planned and the user has not engaged in any specific research for the product.

In brief overview, the present invention relates to an interactive product merchandising method and system. When a user arrives at a Web site, the method and system of the invention provides an interactive unified display (presenting a selected product) that seeks to engage the user in an interactive dialog with the unified display unit in order to determine if the selected product is of interest to the user and, if not, what other products may be of interest to the user. By the user's interaction, the method and system seeks to respond to the user's choices, and provide a model of impulsive marketing for the nonintentional or nondirected user of the Web. The method and system collects and composes heterogeneous information into the unified display unit, and provides the user multiple options, such as product vendors, pricing, product ratings, product reviews, vendor ratings, vendor reviews, related relevant information from blogs (i.e., Web logs) and other information, related product information, selected relevant product recommendations, and an optional search mechanism. Thus the nonintentional user can indicate what is of interest at the moment and pursue an appropriate link (e.g., product review). Also, the unified display unit can be modified accordingly, based on the actions of the user to display another product based on the end user's activities using the UI (user interface) of the unified display unit.

Another problem with conventional advertising and online merchandising systems is that the user is interested in a product, but does not complete the purchase, typically due to incomplete information. For Web sites with shopping carts, this is sometimes termed as "shopping cart abandonment" at the point of check out.

In the approach of the invention, the unified display unit seeks to provide varied, heterogeneous sources of information that allow the impulsive shopper to investigate the prospective purchase more thoroughly, such as through product reviews and examination of related products. The impulsive shopper is more likely to complete the purchase before some distraction occurs and/or the impulse wanes. The services provided by the invention thus overcome one of the biggest obstacles to the increased success of online direct marketing, that is, the lack of easy access to relevant sales information at the point of sale to overcome objections and reinforce the buying decision.

More specifically, the approach of the invention provides an intelligent and interactive product merchandising system and method for dynamically preparing and generating online shopping windows, pages or units that select and promote products or services by leveraging an intelligent evidence gathering scheme. First, the approach of the invention selects a product to promote. The approach then relies on a combination of information seeking agents (e.g., software agents) to collect and provide easy access to the heterogeneous information, including comparisons, recommendations, product reviews, merchandising support and promotions (e.g., discounts, coupons, item sale prices, etc.) from multiple online and offline destinations to the user (e.g., online shopper) via the interactive user interface or unified display unit.

The approach of the invention also provides a method and system for composing and displaying the heterogeneous but related pieces of information about a product or service into the unified display unit that provides easy access to relevant product and/or service related sales information to the user (e.g., end consumer). The unified display unit provides an easy to use interface that also allows the user (e.g., online consumer) to input direct feedback about his (or her) preferences.

Furthermore, the approach of the invention provides a method and system that tracks and learns to adapt the product or service selection process to select and display additional products and/or services that match the likes and dislikes of the user (e.g., end users and consumers), based on historical transactions data and the user input from the interactive display units (e.g., unified display units).

The approach of the invention also provides a service that can be used for selecting and presenting targeted and relevant content, services, offers, promotions, advice and/or recommendations to users (e.g., customers, also known as online visitors) seeking information/services on the Internet or a network of computer devices like PDAs (personal digital assistants), cell phones, and/or other suitable electronic devices. The invention is not restricted to just targeting users (e.g., customers or visitors) on the Internet. It can also be used for handling any online or offline transaction between an information seeking agent (e.g., user and/or buyer) and an information providing agent (e.g., Web site provider and/or seller).

FIG. 1 is a schematic diagram of a networked environment 20 for a product merchandizing system, according to the principles of the invention. FIG. 1 illustrates an end-user computing device 22, destination server 24, a product merchandizing server 26, information sources 28a, 28b, 28c, 28d (referred to as "information sources 28"), connected through networks 30a and 30b (referred to as "networks 30") by means of communication connections 32a, 32b, 32c, 32d, 32e, 32f, 32g, 32h (referred to as "communication connections 32").

The end-user computing device 22 is an electronic device including computing capabilities, such as a desktop computer, a laptop computer, a palmtop computer, a PDA, a mobile communications device (e.g., cell phone), a hybrid device (e.g., a device including both mobile communications and digital computing capabilities) and other suitable devices. The end-user computing device 22 includes user input devices (e.g., keyboard and mouse), one or more output devices (e.g., LCD display or CRT display), data storage (e.g., volatile memory or nonvolatile data storage), and a device processor 38 (e.g., digital microprocessor). The end-user computing devices 22 have the capability of presenting a destination presentation 34 (e.g., Web site) on the output display that includes a unified display unit 36, such as a graphic user interface (GUI) for interaction by the end-user. The device processor 38 executes software instructions for the destination presentation 34 and unified display unit 36 that are stored in the data storage of the end-user computer 22 and/or downloaded from the product merchandizing server 26 to perform the functions of the destination presentation 34 and unified display unit 36 as described herein.

The destination server 24 is a server computer, desktop computer, or other digital computing device suitable for executing destination server software 40. Typically, the destination accessed by an end-user is a Web site provided and maintained by the destination server software 40. The destination server 24 includes a destination server processor (e.g., digital microprocessor) that executes software instructions for the destination server software 40 to perform the functions of the destination server software 40 as described herein. The destination is not required by the invention to be a Web site (e.g., based on HTML hypertext markup language)), accessed over the Internet using the IP (Internet Protocol), but can be based on other suitable types of user interface and display software protocols and technologies capable of providing a destination presentation 34 (e.g., displayed Web site) to an end-user at the end-user computing device 22. Accordingly, the destination presentation 34 is not required to be a Web site presentation (e.g., based on HTML (hypertext markup language)), but can be based on other forms of UI and/or presentation software. The destination presentation 34 can also be based on UI, presentation software, network protocols, and related software and technologies to be developed in the future.

The product merchandising server 26 is a server computer, desktop computer, or other digital computing device suitable for executing product merchandising software 42. The product merchandising server 42 includes a PM (product merchandising) server processor 44 (e.g., digital microprocessor) that executes software instructions for the product merchandising software 42 to perform the functions of the product merchandising software 42 as described herein. The product merchandizing software 42 provides the content for the unified display unit 36 that is presented as part of the destination presentation 34 (e.g., Web site presentation) displayed on a display device at the end-user computer 22. In one embodiment, the user accesses a destination over a network 30a through communication connections 32a and 32b and the end-user computing device 22 displays a destination presentation 34 at the end-user computing device 22. The destinations server software 40 and/or the end-user computing device 22 includes one or more lines of calling or invoking code (e.g., HTML code) that invoke or call the product merchandizing software 42 through communication connection 32c. The product merchandising software 42 gathers appropriate product information from various information sources 28 to compose the unified display unit 36 which is downloaded from the product merchandizing server 26 over communication connections 32c and 32a for display in the destination presentation 34 on the end-user computing device 22. This process is discussed in more detail in connection with FIGS. 3 and 4 and elsewhere herein. In one embodiment, the product merchandising software 42 is implemented in PERL (Practical Extraction and Report Language). In alternate embodiments, the product merchandising software 42 is implemented in any suitable programming language or script. The calling code can be any suitable code (e.g., HTML or other markup language, script, applet code, and/or Java code) capable of communicating with the product merchandizing software 42, including programming code and technologies to be developed in the future.

The information sources 28 includes sources of information used by the product merchandizing software 42 to provide product related information for a selected product that is presented in the unified display unit 36. In one case, the information sources (e.g., 28a or 28b) can be databases that provide information on characteristics, pricing, vendors, ratings and other product information. For example, the information source 28a can be a product information database included as part of or connected directly (e.g., by cable) through communication connection 32d to the product merchandising server 26. The information source 28b can be a product information database connected to the product merchandizing server 26 through communication connection 32e through a local area network (LAN), wide area network (WAN), storage area network (SAN), or other network connection. The information sources 28c and 28d can be servers or other computers accessible through a network 30b (e.g., the Internet) to provide information obtainable over the network 30b, such as product reviews, product ratings, vendor reviews, vendor ratings, pricing, log information (e.g., Web logs or blogs), and other information that can be included in a unified display unit 36 by the product merchandising software 42.

The network 30 is a network suitable for providing a connection between the end-user computer 22, destination server 24, product merchandizing server 26, and information sources 28. The network 30 can be the Internet, LAN, WAN, SAN, metropolitan area network (MAN), wireless networks (e.g., Bluetooth or IEEE 802.11), mobile telephone networks, (e.g., cellular network based on CDMA (code division multiple access)), or other suitable networks, as well as networks to be developed in the future.

The communication connections 32 can be based on any suitable protocol, such as packet based protocols (e.g., TCP/IP or Transmission Control Protocol/Internet Protocol), WAP (wireless application protocol), wireless protocols (e.g., Bluetooth, IEEE 802.11), mobile telephone protocols (e.g. CDMA or Code Division Multiple Access), or other suitable protocols, including protocols to be developed in the future. The communication connections 32 can be based on any suitable medium, such as hard wired cable, fiber optic cable, wireless connections (e.g., radio wave connection or connection through other parts of the electromagnetic spectrum), and other suitable connections.

Figure 2:
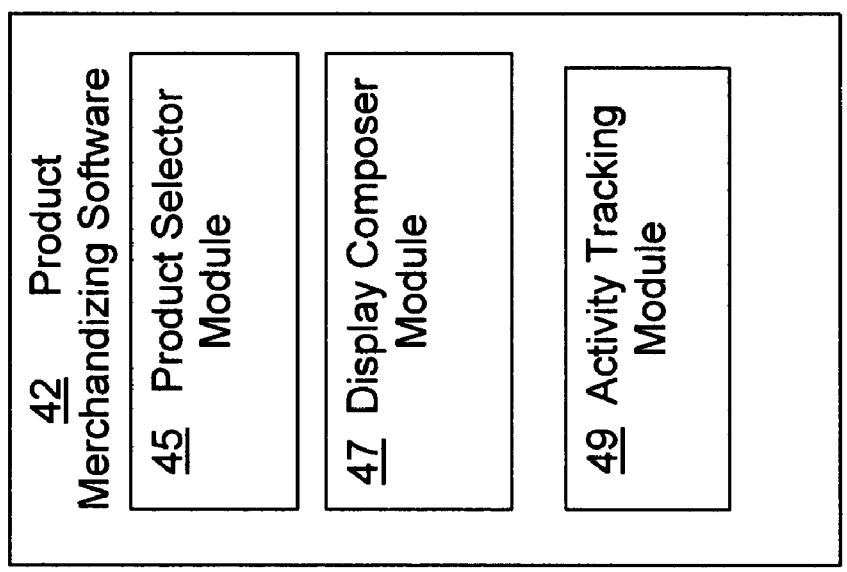
FIG. 2 is a block diagram illustrating modules of the product merchandising software of FIG. 1.

FIG. 2 is a block diagram illustrating modules 45, 47, 49 of the product merchandizing software 42 of FIG. 1. In one embodiment, the modules 45, 47, 49 are software modules or code that include the product selector module 45, the display composer module 47, and the activity tracking module 49. The product selector module 45 performs the function of selecting a product to promote based on extracted information pertaining to the destination (e.g., Web site) accessed by the end user (see also FIGS. 3 and 4) and other product selection functions as described herein. The display composer module 47 performs the functions of collecting heterogeneous information related to the selected product and composing the heterogeneous information into the unified display unit 36 for promotion of the selected product for the end-user at the destination (e.g., Web site) (see also FIG. 3) and related functions as described herein. The activity tracking module 49 performs the function of tracking the activity and input by the end-user interacting with the unified display unit 36 for use as input in selecting one or more other products (not previously selected) for another promotion to the end-user (see also FIG. 3) and related functions as described herein. The end-user supplies input that can be tracked by the activity tracking module 49 by providing entries to a search option 332 provided as part of the unified display unit 36 and/or click-through data on any one of the suggested links within the unified display unit 36 (see FIGS. 6A and 6B).

Figure 3:
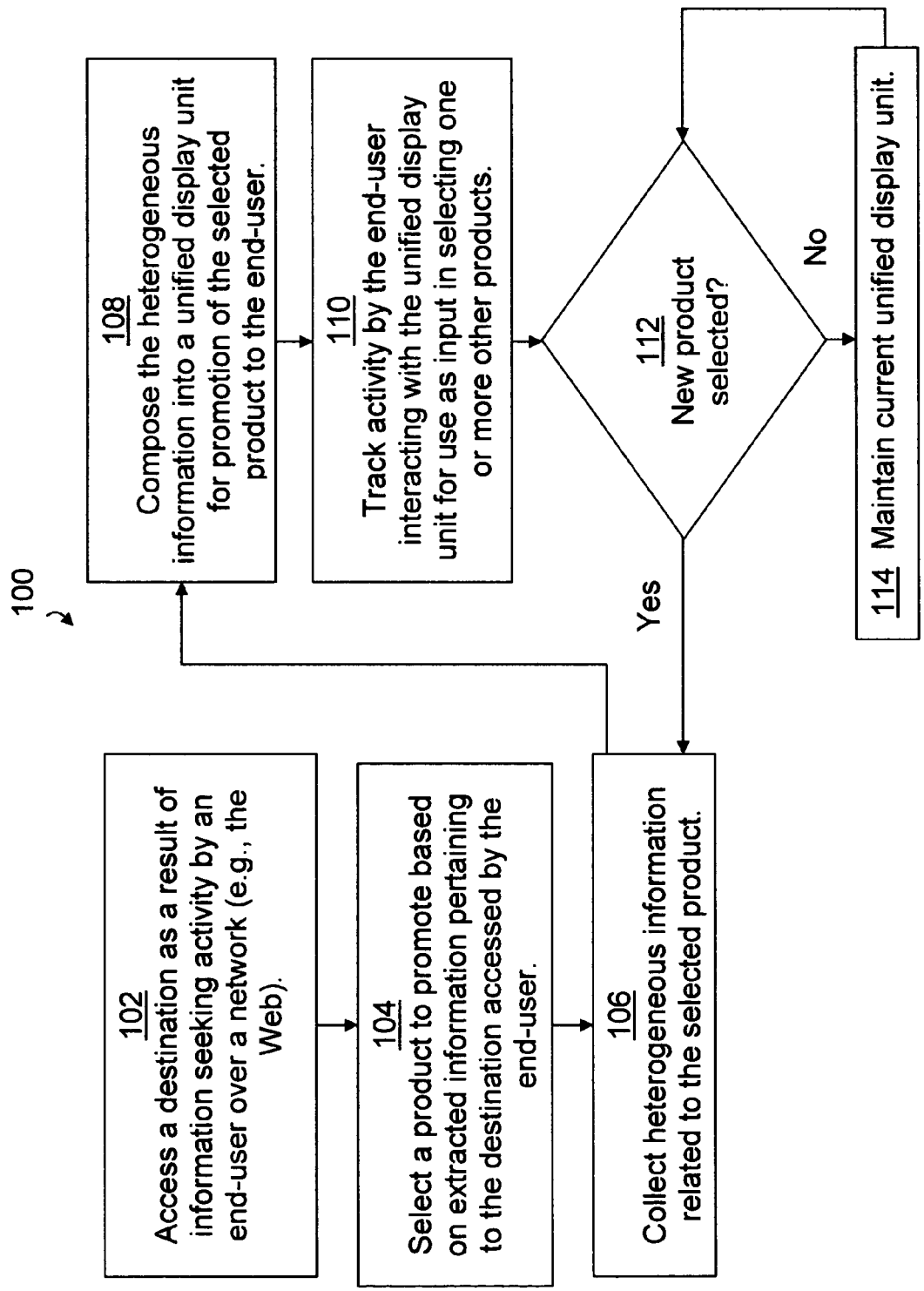
FIG. 3 is a flowchart of a procedure for product merchandizing, in accordance with the principles of the invention.

FIG. 3 is a flowchart of a procedure 100 for product merchandizing, in accordance with the principles of the invention. First, a user accesses a destination (e.g., Web site) as a result of information seeking activity by the end user over a network (e.g., Internet) (step 102). Typically, the end-user is browsing the Web in a nonintentional manner, that is, without a specific purchase in mind. For example, an end-user is interested in browsing various information sources, but does not have a specific purchase (e.g., camera or artistic photograph) in mind.

Next, the procedure 100 selects a product to promote based on extracted information pertaining to the destination (e.g., Web site) accessed by the end user (step 104). This step (104) is based on a real-time (sometimes off-line) information extraction process to collect information pertaining to the final destination where the unified display unit 36 is being displayed. The extracted information can be based on a product database (e.g., from an information source 28 accessed by the product merchandizing software 42). In one embodiment, this process relies on an evidence-gathering scheme (see FIG. 4) to collect information related to either the final destination (such as the Web page) that is under consideration, and can also include an end consumer profile (e.g., previous shopping history, search activity, online browsing activity etc). The profile information can also be based on the end-user context, which is determined by the end destination (e.g., Web page) and the content on the destination. Based on this information, the procedure 100 (step 104) selects the most appropriate product to promote at that point in time. The term "product" as used herein includes any suitable item to purchase, such as physical products (e.g., camera), electronic products (e.g., downloaded software or music), services, travel products (e.g., a packaged tour), recommendations (e.g., recommendation of a person by a dating service), and information (e.g., an article purchased and downloaded over the Web), as well as prospective purchases, such as referrals (e.g., referral to another Web site, to a physical store, a person, or a service that may lead to a purchase).

The procedure 100 then collects heterogeneous information related to the selected product (step 106). Information related to one or more selected products (including services if appropriate), such as images, descriptions, ratings, etc., is collected by a set of agents (e.g., software agents invoked by the product merchandising software 42) that reach out to various distributed databases or information sources 28 across the internet or a network 30b of computer devices. Based on available data (from step 104) and historical transactions data, a set of related products (including services if appropriate) are also selected for this promotion (to be included in the unified display unit 36) in conjunction with one or more selected products.

Next, the procedure 100 composes the heterogeneous information collected in step 106 into the unified display unit 36 for promotion of the selected product to the end user (step 108). The heterogeneous information can include images, descriptions, ratings, vendors, prices, product reviews, information from the Web (e.g., from Web logs and other sources), a set of related products, and other information. The display unit 36 is dynamically generated by pooling together information from one or more sources 28 and is displayed to the end user as part of the destination presentation (e.g., Web site) 34 at the end-user computing device 22.

The procedure 100 can then track activity by the end-user interacting with the unified display unit 36 for use as input in selecting one or more other products (not previously selected) (step 110). The activity by the user can include selections that the user makes, such as clicking on items of the heterogeneous information presented in the unified display unit 36. The unified display unit 36 can also provide a mechanism for the end user to directly influence the selection of the products, via an optional search interface included as part of the unified display unit 36, or an optional product recommendation and voting interface included as part of the unified display unit 36, and the procedure 100 (step 110) can track the search entries and user inputs as part of the end-user activity.

The procedure 100 then determines whether to select a new product or not (step 112). That is, if the end-user has engaged in minimal activity (so that there may not yet be enough information to select a new product), if a suitable new product to promote cannot be found in the appropriate product database, or if, for some other reason, a new product cannot be selected at a particular point in time, then the current unified display unit 36 is maintained (step 114). If one or more new products is selected, then the procedure 100 proceeds to repeat steps 106 and 108 to collect heterogeneous information and compose a new or revised unified display unit 36 based on one or more new products for presentation to the end-user, and continues to track any new activity by the end-user at the new or revised unified display unit 36 (repeating step 110).

Thus the end-user, who is engaged in nonintentional or browsing activity that seeks general information, can interact with the unified display unit 36 as described above (step 110) leading to a new or revised unified display unit 36 as a result of the end-user's activities. The end-user enters into an interaction or dialog with the product merchandising software 42 through one or more unified display units 36 (displayed in a process of revision), which can lead to the completion of an unplanned or impulsive purchase, because the end user is able to have direct access to relevant sales information (e.g., collected heterogeneous information, as in step 106) through the unified display unit 36 at the point of sale to overcome objections and reinforce the buying decision. The offering of new products through unified display units 36 (repeating of steps 112, 106, 108, and 110) aids in encouraging the impulsive buying decision and overcoming objections (e.g., through the presentation of other products not previously displayed in one or more revised or new unified display units 36).

Figure 4:
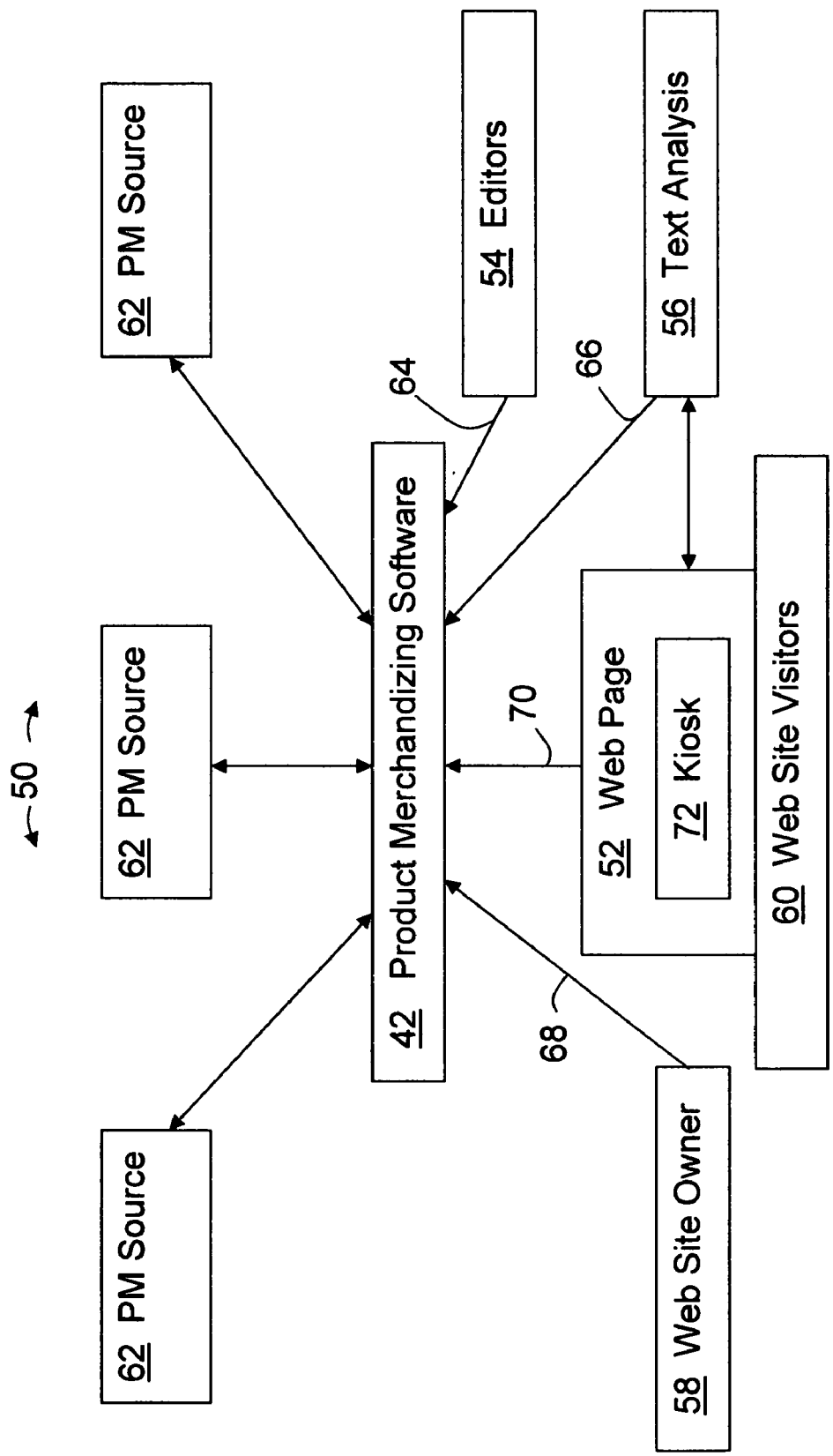
FIG. 4 is a schematic diagram of an evidence gathering and pooling system, according to the principles of the invention.

FIG. 4 is a schematic diagram of an evidence gathering and pooling system 50, according to the principles of the invention. The evidence gathering system 50 includes the product merchandizing software 42, a Web page 52, editors 54, text analysis system 56, Web site owners 58, and product merchandizing (PM) sources 62. The Web page 52 is an example of a destination presentation 34. The Web page 52, includes an online kiosk 72, which is an example of a unified display unit 36. The Web site visitors 60 are examples of end-users accessing a destination (e.g., the Web page 52). In one embodiment of the invention, the evidence gathering and pooling functions are performed by the product selector module 45 of the product merchandising software 42. The PM sources 62 are examples of the information sources 28.

The evidence gathering and pooling system 50 takes input "votes" from several sources, to select and display the selected item (e.g., product). Votes can be in form of keywords, topics, categories, phrases, and other suitable text entities. The system can collect "votes" from editors 54, the text analysis system 56, Web site owners 58, and visitors 60 to the Web site.

Editors 54 select and seed the system 50 with editorial votes 64, which are relevant keywords, topics, categories that might be relevant to the Web site 52 or to the visitors 60 to the Web site.

The text analysis system 56 parses the contents of the Web page 52 and selects the most relevant set of text analysis votes 66 using a product-centric information extraction process.

Web site owners 58 seed the system 50 with a set of destination owner votes 68 that they consider to be relevant and/or useful for their Web site 52.

Visitors 60 to the Web site 52 can interact with the online kiosks 72 and directly or indirectly submit their visitor votes 70 to the system 50 by their interaction with the kiosk 72, searching for other related items or selecting items that either they are interest in or they would like to recommend to other visitors 60 to this site.

The evidence gathering scheme is used in determining which product to select. The votes can be weighted. That is, votes 64 from the editors 54 can be given greater weight that the votes 66 of the text analysis system 56. In another example, votes 68 from the Web site owners 58 can be given greater weight than some other votes.

The evidence and information gathered is analyzed by an intelligent manner based on a probabilistic approach using the information gathered (e.g., votes and other information) related to the selection of a product. In one embodiment, a Bayesian approach is used to determine one or more products that provide a best match (e.g., probabilistic match) to the gathered information. In alternate embodiments, the invention is based on other intelligent approaches, such as genetic algorithms, neural networks, rule-based classification, and predictive modeling systems.

Figure 5:
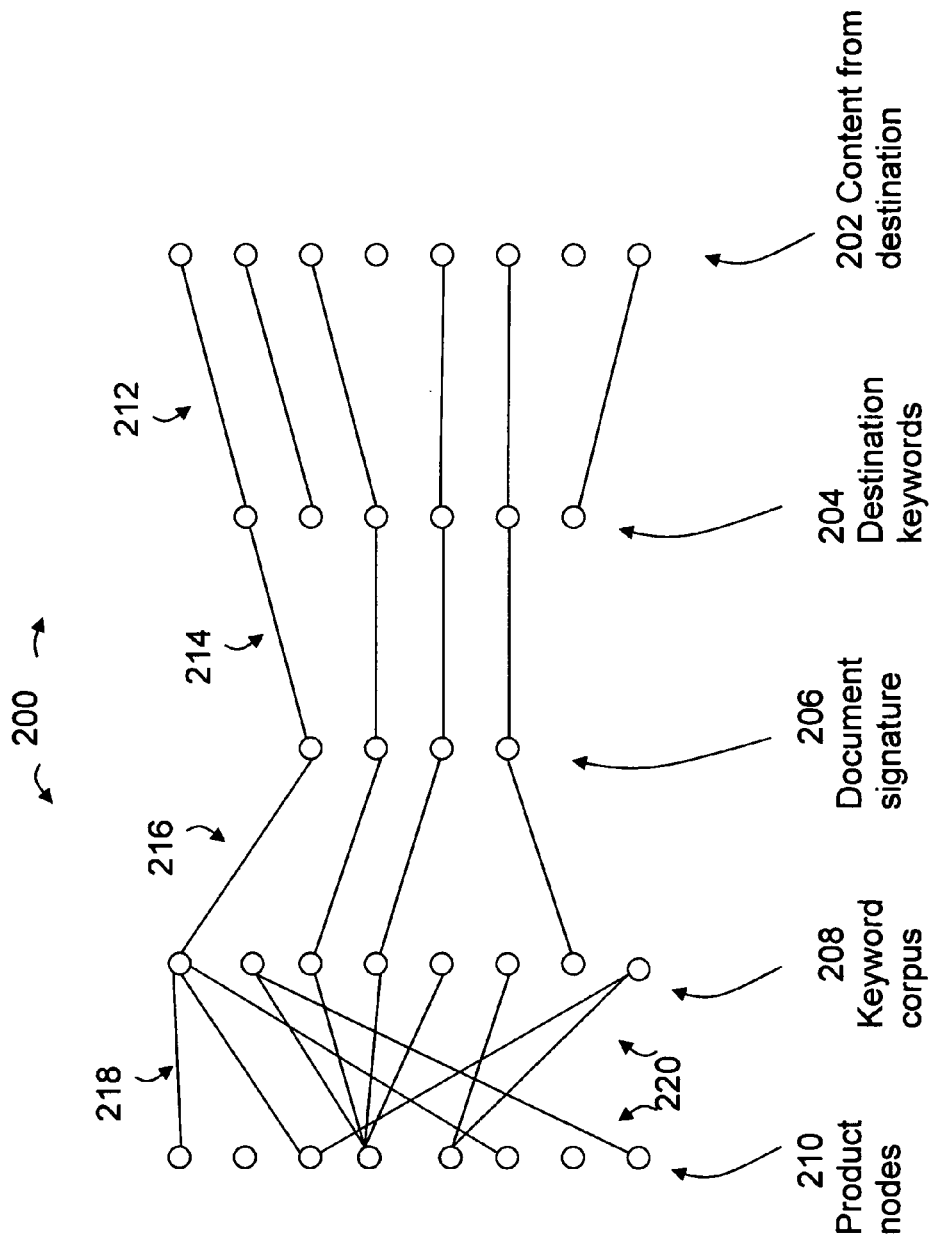
FIG. 5 is a schematic diagram of an information extraction process for product and keyword mapping, according to the principles of the invention.

The approach of the invention is aimed at a product-centric approach (see FIG. 5). That is, conventional approaches typically match to topics (e.g., beaches), whereas the approach of the invention matches to provide a selection to one or more products (e.g., beach umbrellas). The unified display unit 36 can thus be based on a product approach, for example, by listing a product, including vendors, product ratings, vendor ratings, pricing, product reviews, vendor reviews, and other information specifically related to the product.

FIG. 5 is a schematic diagram of an information extraction process 200 for product and keyword mapping, according to the principles of the invention. The information extraction 200 includes several stages, proceeding from right to left, and represents a product centric approach. The first stage is based on the content from a destination (e.g., Web page) 202 in an unprocessed form (that is, includes most, if not all, of the content). This content can be in the form of words, headers, banners, images, etc. The content of the first stage is mapped (as indicated by content mapping 212) to the next stage, which is based on destination keywords 204. The content mapping 212 is based on using heuristic rule-based information extraction techniques to extract the main content of the page (e.g., remove irrelevant content such as headers and advertisements).

The destination keyword mapping 214 uses artificial intelligence and statistical text mining techniques such as TFIDF (Term Frequency Inverse Document Frequency) methods to extract the most useful words from the destination keywords 204 to form the document signature 206. For example, this technique removes junk or irrelevant words such as "of" and "the."

The process 200 then performs a document signature mapping 216 to map the document signature 206 to the keyword corpus 208. A product-keyword conceptual network 220 is based on the keyword corpus 208 and product nodes 210, along with the weighted links 218, according to the principles of the invention.

The keyword corpus 208 is typically constructed at a previous point in time, as will be described next. The approach of the invention uses proprietary spiders to access information sources 28. In one embodiment, the approach is to spider content available across the Web on publicly shared destinations (e.g., Web pages) or in proprietary licensed databases to collect relevant information for each product. For each word that occurs on the same destination (e.g., Web page) along with a given product name, a weighted link 218 is initiated and created within the product-keyword conceptual network 220. The link weights for each link 218 are incremented for multiple occurrences of a product and a word; that is, a product-word pair occur on multiple destinations (e.g., Web pages). For example, if a "product A" and "PDA" occur together in 10 destinations, then the weighted link 218 between "PDA" (a node in the keyword corpus 208) and "product A" (a product represented by a product node 210) is given a weight of 10. If "product A" and "computer" occur in one destination, then the weighted link 218 between "computer" (a node in the keyword corpus 208) and "product A" is given a weight of one. If "product A" and "bird" do not occur together in any destination, then there is no weighted link 218 between "bird" (a node in the keyword corpus 208) and "product A". The weights across the networks are normalized to create the final conceptual network 220.

The information extraction process 200 continues from the document signature stage 206 when a probabilistic weighted marker propagation approach is used to distribute and pool the evidence across all products 210 in the database based on the weighted links 218. Each word (from the document signature 206) is a marker (or vote or piece of evidence) that moves through the information extraction process 200 from right to left in FIG. 5. This movement can be conceptualized as a group of marbles (that is, markers or words) thrown into a network from the document signature 206 to keyword corpus 208 to the product nodes 210 rolling down the weighted links 218 in the conceptual network 220 to settle in the product nodes 210 in a process of weighted marker propagation. The markers accumulate in the product nodes 210 based on the weighting. A marker, such as "PDA," can travel over a strong link (e.g., between "product A" and "PDA") which provides multiple weight or votes for product A. If a link is weak, then it can decay. Then, one or more product nodes 210 with the highest weighted votes are selected.

Figure 6A:
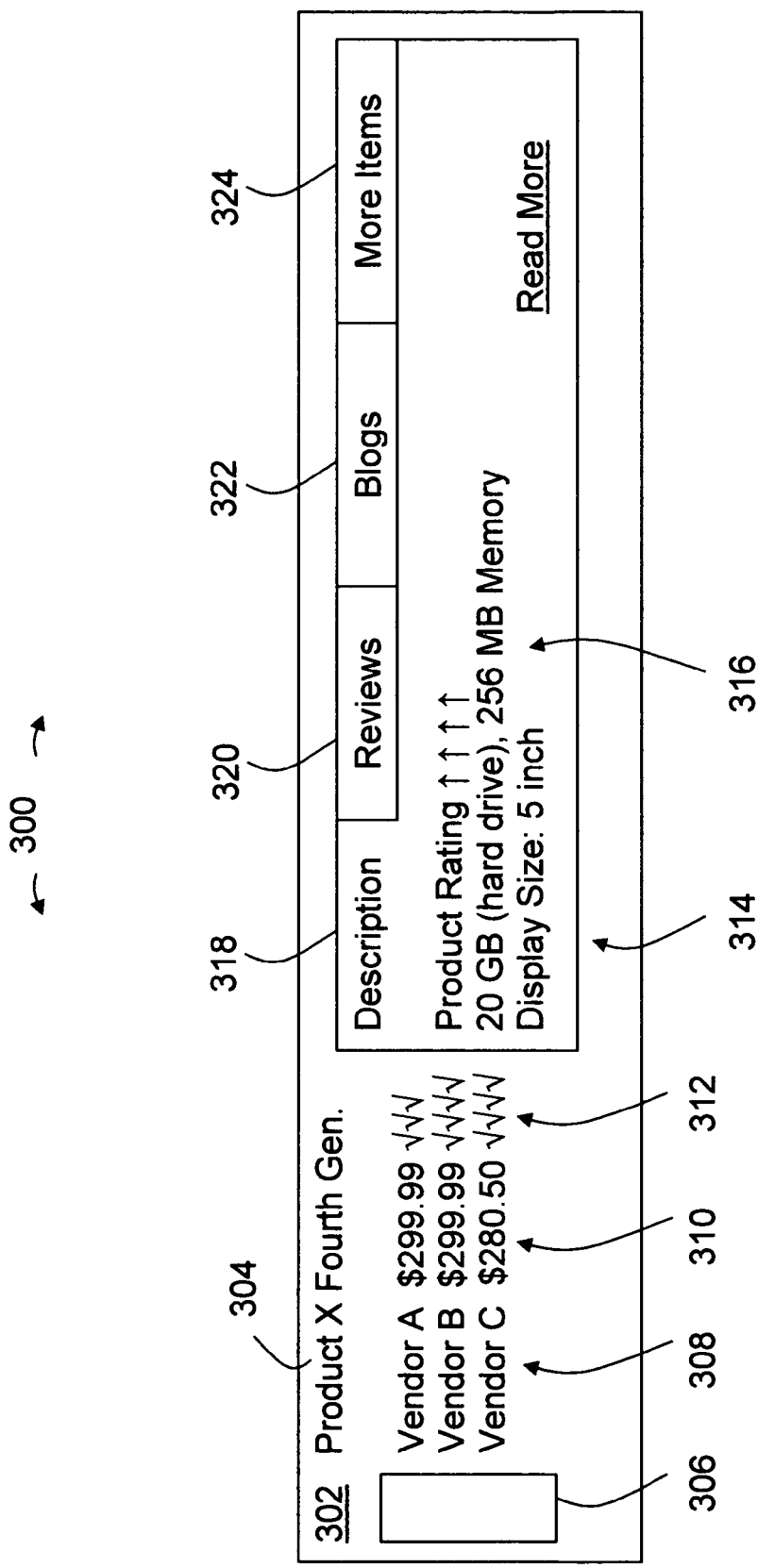
FIGS. 6A and 6B are illustrations of a user interface for a unified display unit, according to the principles of the invention.
Figure 6B:
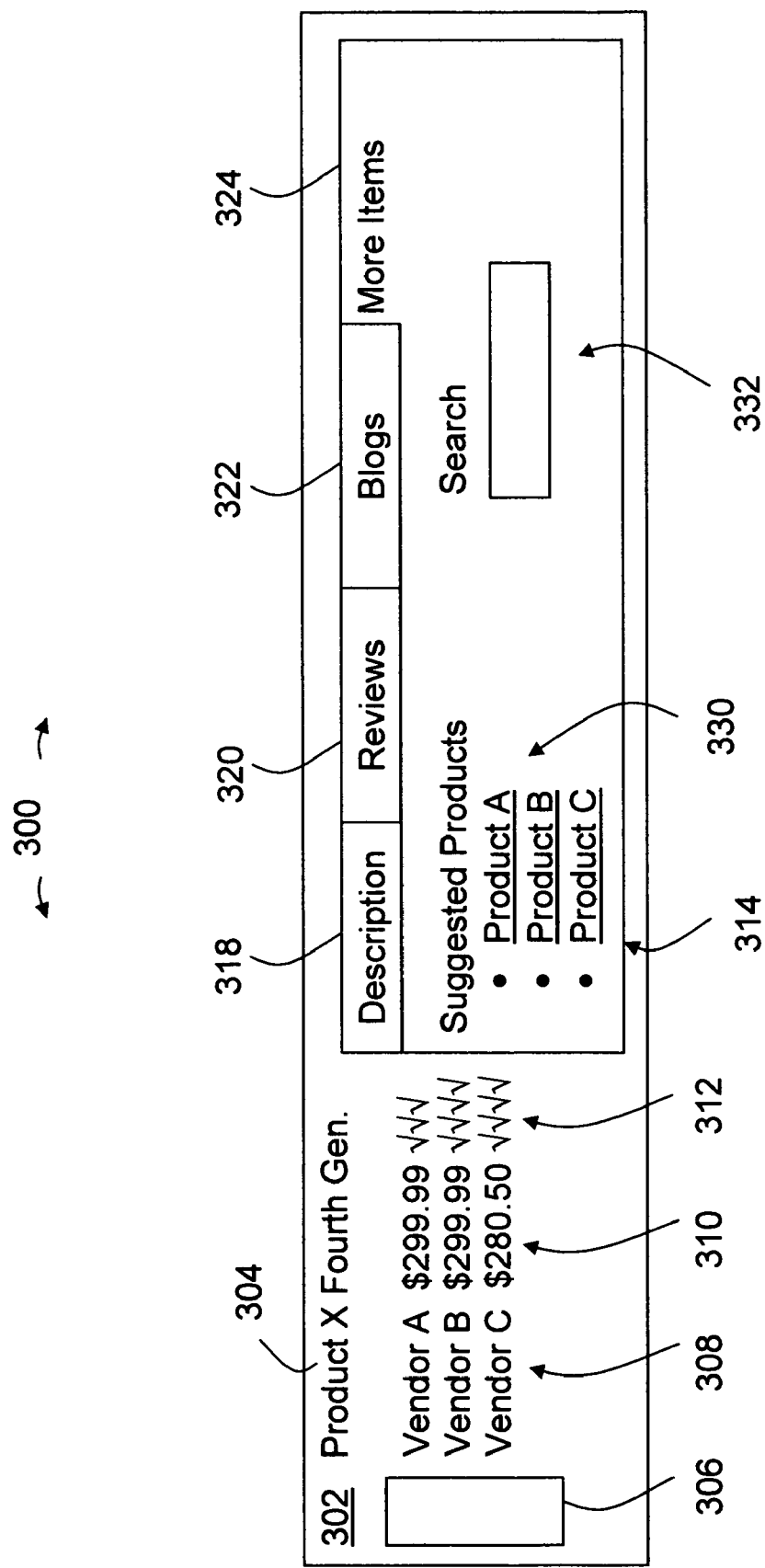

FIGS. 6A and 6B are illustrations of a unified display unit user interface (UI) 300, according to the principles of the invention. The unified display unit UI 300 includes a product box or frame 302, which includes a product title 304 and product image 306, which provide targeted product merchandising. The UI 300 also provides a vendor list 308, pricing 310, and vendor ratings 312, which provide a robust comparative shopping experience for the end-user. The UI 300 also includes a tab display 314, which includes description 318, reviews 320, blogs 322, and more items 324 tabs. In FIG. 6A the description tab 318 is selected so that a product description 316, including product ratings, is shown, which provides for product promotion for the product 304. The reviews tab 320 provides product reviews related to the product 304. The blogs tab 322 provides related relevant product information from Web logs. The blogs tab 322 (or an equivalent) can also provide other information from the Web (e.g., articles, discussions, commentary), or from other sources (e.g., databases of articles). The more items tab 324 provides other items that provide information related to the product 304 (see FIG. 6B). In other embodiments, the UI 300 is not restricted by the invention to the form and content shown in FIGS. 6A and 6B, but the UI 300 takes on other forms (e.g., has a different size and/or shape), links are displayed and activated in various ways, content is displayed in a different manner, and other types of relevant product data are included.

In FIG. 6B, the more items tab 324 is selected. The tab display 314 shows suggested products 330, which provide an intelligent product recommendation. The tab display 314 also shows a search option 332, which provides an opportunity for the end-user to enter information for a search for topics and/or products that they are interested in. In another embodiment, the tab display 314 can show an optional product recommendation and voting interface for input by the end-user so that the end-user can directly influence the selection of products for both the end-user and other users.

The method and system of the invention provides a comprehensive service that can be used by a variety of industries to contextually select and promote their products and services along with related information to the end-users (e.g., end consumers), to enable online e-commerce. Thus, the approach of the invention can be applied to various applications, as follows:

For product merchandising, Web publishers (affiliates) 58 can use the approach of the invention to dynamically promote and sell products, from a variety of online shopping destinations, to the visitors 60 to their Web sites 52.

For the travel industry, the approach of the invention can be used by travel businesses to promote their offerings to an online audience (e.g., end-users) along with travel related information such as maps, hotels, car rentals, and other suitable information, while promoting particular travel offers.

For the healthcare industry, the approach of the invention can be used by healthcare and pharmaceutical businesses to promote their offerings to an online audience (e.g., end users) with healthcare related information such as medicine reviews, related health tips, recommendations, physician referrals, and other suitable information.

For the auto industry, the approach of the invention can be used by the auto industry to promote their offerings to an online audience (e.g., end users) with auto related information such as car reviews, insurance quotes, related maintenance tips, dealer promotions, and other suitable information.

The method and system of the invention can be used in other applications. The approach of the invention can also be used to dynamically generate online shopping pages for any given context, topic or keyword of choice. The approach of the invention can also be used to provide product enhanced search results, along with relevant information pertaining to the product or service that is being promoted by the merchant, or Web publisher 58, or the service provider.

In one embodiment, a computer program product including a computer readable medium (e.g., one or more of DVD's, CD's, diskettes, tapes, and/or other suitable medium) provides software instructions for all or part of the product merchandising software 42. The computer program product can be installed from the computer readable medium by any suitable software installation procedure, as is well known in the art. In another embodiment, the computer program product is a computer program propagated signal product, and the computer readable medium is a propagated signal transported on a propagation medium (e.g., an electrical signal propagated over the Internet or other network, a radio wave, an infrared wave, or other electromagnetic wave). The computer program propagated signal product is embodied on the propagated signal carried on the propagation medium and provides software instructions for all or part of the product merchandizing software 42. Alternatively, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instruction for all or part of the product merchandizing software 42 sent in segments (e.g., packets) over a network over a period of seconds, minutes, or longer.

Having described the preferred embodiments of the invention, it will now become apparent to one of skill in the arts that other embodiments incorporating the concepts may be used. It is felt, therefore, that these embodiments should not be limited to the disclosed embodiments but rather should be limited only by the spirit and scope of the following claims.

For example, the networks 30 and communications connections 32 can be based on mobile telephone technologies and protocols (e.g., CDMA), so that the destination is not a Web site accessed through the Internet, but can be a destination site maintained by a mobile telephone provider, or other provider connected directly to the mobile telephone network. In such a case, the end-user computing device 22 can be a mobile telephone, or other electronic device, such as a PDA that also provides mobile telephone communications.

In other examples, the approach of the invention can be adapted to other global networks than the Internet, and other technologies that TCP/IP protocols and other programming approaches, e.g., other markup languages than HTML, as well as protocols and technologies to be developed in the future.

The product merchandizing software 42 can be executed on any suitable computing device having a processor capable of executing the instructions of the software 42. That is, the invention does not require the product merchandizing software 42 to be executed on a specific computer designated or functioning as a product merchandising server 26 (as shown in FIG. 1).

In another example, the modules 45, 47, 49 can be any suitable form of software, such as software code, procedures, routines objects, scripts, functions, services, environments, or other suitable software entities, as well as software entities to be developed in the future. The modules 45, 47, 49 are not required by the invention to be the same type of software entity, or to be located together (as shown in FIG. 2) but can be located on different hardware servers or computers using a distributed computing approach to fulfill the functions of the modules 45, 47, 49 and the product merchandizing software 42 as described herein.

In another example, the functions for the software described herein (e.g., product merchandizing software 42) can be implemented partially or completely in hardware and/or one or more integrated circuits, such as PGA (programmable gate array) or ASIC (application specific integrated circuit) devices. Also, one or more of the modules 45, 47, 49 can be implemented partially or completely in hardware and/or one or more integrated circuits.

What is claimed is:

1. A method for interactive product merchandizing directed to an end-user engaging in information seeking activity to access a destination having content over a network, the method comprising:

accessing the content of the destination to obtain extracted information pertaining to the destination accessed by the end-user;

selecting a product to promote based on the extracted information; and gathering evidence related to product selection based on a weighted processing of input votes based on weighted marker propagation across a conceptual network of weighted links; and the selecting the product to promote comprises generating a keyword corpus based on keywords located in publicly shared destinations and based on weighted links between the keywords based on word occurrence at the publicly shared destinations; accessing content sources based on a plurality of end-user destinations to determine end-user destination keywords based on the content sources; generating markers based on extracting words from the end-user destination keywords; generating a document signature based on the markers; mapping the document signature to the keyword corpus to assign weightings to each marker based on the keyword corpus; accumulating the markers in product nodes based on mapping the assigned weightings for each marker; and selecting the product by selecting at least one product node based on the accumulating the markers;

accessing at least one information source to access at least one image, description, ratings, vendor, price, Web log information, or product review;

collecting heterogeneous information related to the selected product based on the accessing the at least one image, description, rating, vendor, price, Web log information, or product review;

promoting the selected product to the end-user at the destination accessed by the end-user based on composing the heterogeneous information into a unified display unit; and promoting at least one other product based on tracking activity by the end-user interacting with the unified display unit.

2. The method of claim 1 wherein selecting the product to promote comprises selecting the product to promote based on profile information related to the end-user context.

3. The method of claim 1, wherein selecting the product to promote comprises selecting at least one of a service, a recommendation, or a referral.

4. The method of claim 1 wherein promoting the selected product comprises composing at least one of a description, a display of vendors, a display of prices, a product review, a vendor review, a product rating, or Web log information components related to the selected product to form the unified display unit.

5. A system for interactive product merchandizing directed to an end-user engaging in information seeking activity to access a destination having content over a network, the system comprising:

at least one information source;

a processor coupled to the information source, the processor executing product merchandizing software instructions, that configure the processor to:

access the content of the destination to obtain extracted information pertaining to the destination accessed by the end-user;

select a product to promote based on the extracted information pertaining to the destination accessed by the end-user based on evidence gathering related to product selection based on a weighted processing of input votes based on weighted marker propagation across a conceptual network of weighted links; keyword corpus generation based on keywords located in publicly shared destinations and based on weighted links between the keywords based on word occurrence at the publicly shared destinations; content source access based on a plurality of end-user destinations to determine end-user destination keywords based on content sources; marker generation based on extracting words from the end-user destination keywords; document signature generation based on the markers: document signature mapping to the keyword corpus to assign weightings to each marker based on the keyword corpus; marker accumulation in product nodes based on mapping the assigned weightings for each marker; and selection of at least one product node based on the marker accumulation;

collect heterogeneous information related to the selected products the heterogeneous information comprising at least one of images, descriptions, ratings, vendors, prices, product reviews, Web log information, or a set of related products obtained from the at least one information source;

promote the selected product to the end-user at the destination accessed by the end-user based on composing the heterogeneous information into a unified display unit; and promote at least one other product based on tracking activity by the end-user interacting with the unified display unit.

6. A server for interactive product merchandizing directed to an end-user engaging in information seeking activity to access a destination having content over a network, the server comprising:

a processor coupled to at least one information source, the processor having access to product merchandising software instructions:

means for selecting, when executed by the processor based on the product merchandising software instructions, causing the server to access the content of the destination to obtain extracted information pertaining to the destination accessed by the end-user and to select a product to promote based on the extracted information pertaining to the destination accessed by the end-user; based on evidence gathering related to product selection based on a weighted processing of input votes based on weighted marker propagation across a conceptual network of weighted links; keyword corpus generation based on keywords located in publicly shared destinations and based on weighted links between the keywords based on word occurrence at the publicly shared destinations; content source access based on a plurality of end-user destinations to determine end-user destination keywords based on content sources; marker generation based on extracting words from the end-user destination keywords; document signature generation based on the markers; document signature mapping to the keyword corpus to assign weightings to each marker based on the keyword corpus; marker accumulation in product nodes based on mapping the assigned weightings for each marker; and selection of at least one product node based on the marker accumulation;

means for collecting, when executed by the processor based on the product merchandising software instructions causing the server to collect heterogeneous information related to the selected product, the heterogeneous information comprising at least one of images, descriptions, ratings, vendors, prices, Web log information, or product reviews obtained from the at least one information source; and means for promoting, when executed by the processor based on the product merchandizing software instructions causing the server to promote the selected product to the end-user at the destination accessed by the end-user based on composing the heterogeneous information into a unified display unit; and to promote at least one other product based on tracking activity by the end-user interacting with the unified display unit.

\* \* \* \* \*